United States Patent [19]

Riede et al.

[11] 4,422,936
[45] Dec. 27, 1983

[54] DEVICE FOR THE DIFFUSION OF SUBSTANCES BETWEEN TWO FLUIDS VIA SEMIPERMEABLE MEMBRANES

[75] Inventors: Gerhard Riede, Vellinge; Nils-Joel E. Nilsson, Sösdala, both of Sweden

[73] Assignee: Gambro AG, Switzerland

[21] Appl. No.: 245,648

[22] PCT Filed: Mar. 19, 1980

[86] PCT No.: PCT/SE80/00083
 § 371 Date: Mar. 17, 1981
 § 102(e) Date: Mar. 17, 1981

[87] PCT Pub. No.: WO81/02682
 PCT Pub. Date: Oct. 1, 1981

[51] Int. Cl.³ ............................................. B01D 31/00
[52] U.S. Cl. .................................. 210/321.4; 210/541; 55/158; 422/48
[58] Field of Search ............... 210/321, 433, 456, 541; 55/158; 422/48

[56] References Cited

U.S. PATENT DOCUMENTS

| | | | |
|---|---|---|---|
| 3,459,310 | 8/1969 | Edwards | 422/48 X |
| 3,520,803 | 7/1970 | Iaconelli | 210/321.3 X |
| 3,540,595 | 11/1970 | Edwards | 422/48 X |
| 3,734,298 | 5/1973 | Riede et al. | 210/321.3 |
| 4,051,041 | 9/1977 | Riede | 210/321.3 |
| 4,113,625 | 9/1978 | Riede | 210/321.3 |

Primary Examiner—David R. Sadowski
Attorney, Agent, or Firm—Lerner, David, Littenberg, Krumholz & Mentlik

[57] ABSTRACT

A device for the diffusion of substances between fluids through semi-permeable membranes is disclosed. The device includes a stack of alternating spacer plates and semi-permeable membranes including transverse passages for each of the fluids so that one of the fluids is conducted on one side of the membranes while the other fluid is conducted across the opposite side of the membranes, and including inlets and outlets for each of the fluids, and in which at least one of the inlets or outlets includes a fluid duct to divert that fluid from its respective transverse passage to a location between the ends of the stack so that it can be fed into or withdrawn from the device in a direction substantially perpendicular to the transverse passages at that location between the ends of the stack.

9 Claims, 11 Drawing Figures

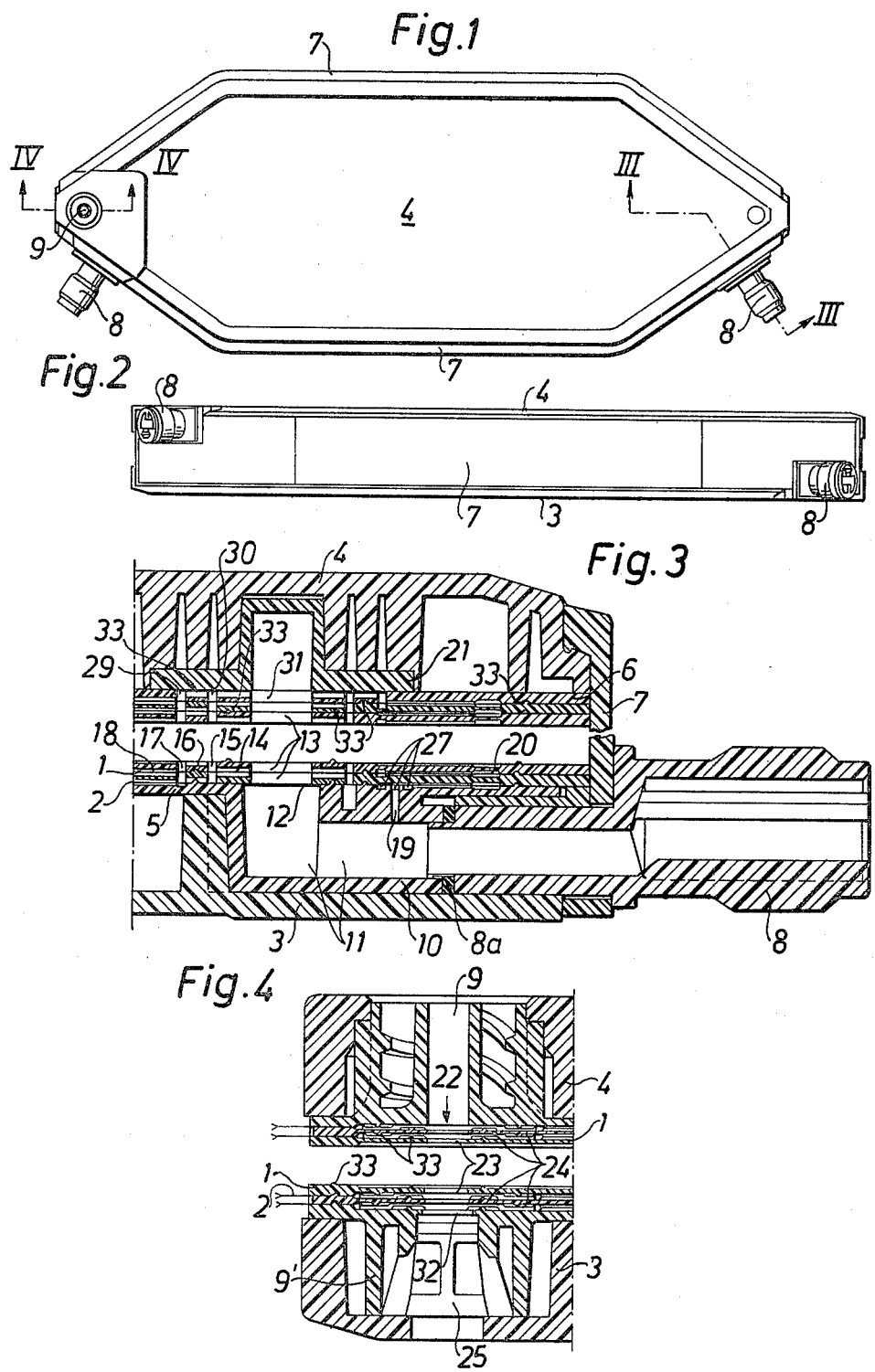

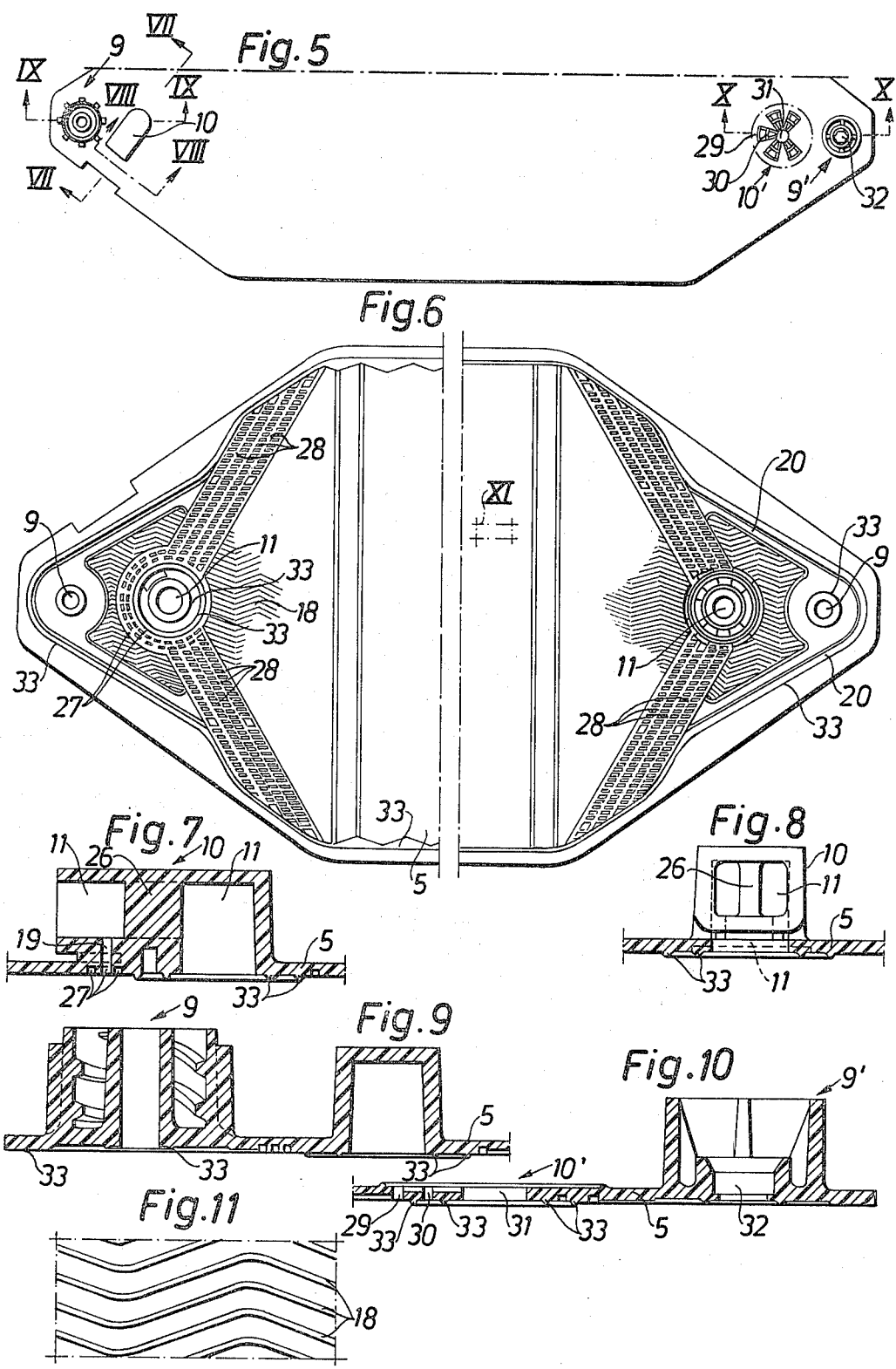

DEVICE FOR THE DIFFUSION OF SUBSTANCES BETWEEN TWO FLUIDS VIA SEMIPERMEABLE MEMBRANES

TECHNICAL FIELD

The present invention relates to a device for the diffusion of substances between two fluids via semipermeable membranes which are arranged in a stack separated by spacer plates which comprise through-holes connected to inlets and outlets respectively for the respective fluids, a first fluid of which is arranged so as to be conducted on one side of the respective membranes and a second fluid on the opposite side of the same membranes.

The device in accordance with the invention is intended foremost to be used for the purification of blood, that is to say as a so-called artificial kidney. However, it will be clear to those skilled in the art that the apparatus in accordance with the invention can also be used for many other purposes. It may be used for example for the oxygenation of blood. The first of the above-mentioned fluids will then consist of blood, whilst the other will consist of oxygen or an oxygen mixture. Alternatively the device, in accordance with the invention, may be used for the transfer of substances from one gas to another. The term fluid, as used in following description, means therefore gas as well as liquid.

BACKGROUND ART

Apparatuses of the above-mentioned type are known in themselves and are described for example in U.S. Pat. Nos. 3,411,630, 3,501,011, 3,511,381, 3,516,548, 3,734,298, 3,837,496,, 4,051,041, 4,062,778 and 4,113,625, which all show apparatuses comprising a stack of spacer plates with membranes, preferably arranged in pairs between them.

DISCLOSURE OF INVENTION

The device in accordance with the invention is characterized in that the inlet and/or outlet for at least one of the said fluids is connected from the side to a duct intersecting the stack and formed by the said through-holes. This arrangement provides substantial advantages which will be evident from the following description. It is an appreciable advantage that the stack in its entirety including clamping elements for the same can be made lower than in conventional designs.

The membranes are preferably arranged in pairs between the spacer plates. This makes it possible to conduct the blood without contact with the plates between membranes in the individual pairs. It is also possible, however, to conceive designs with single membranes arranged between adjoining spacer plates.

The stack of spacer plates and membranes between them is arranged appropriately between a top plate and a bottom plate which may then include within them the inlet and outlet for the second fluid formed in conventional manner. If the last-mentioned inlet and outlet represent those requiring less space, the top and bottom plates can be made thinner than if they were to contain also the inlet and outlet requiring more space.

The stack of spacer plates and membranes between them can appropriately be given an elongated shape with tapering ends. In such a realization the inlet and/or outlet connected from the side to the said duct may be formed of a connecting nipple which is wholly inside the otherwise largest dimensions in lateral or in longitudinal direction of the device. This connecting nipple will then require no extra space, whilst being well protected at the same time.

In a preferred embodiment of the subject of the invention, an intermediate plate is arranged between the said top plate and the nearest spacer plate. This intermediate plate may be provided with an angle nipple which contains an angular duct, one end of which is connected to an inlet or an outlet and whose other end is connected to the duct intersecting the stack and formed by the said through-holes. In this manner an apparatus with a small number of seals is achieved.

A further advantage is obtained if the intermediate plates are patterned in substantially the same manner as the spacer plates on the side facing them. By imparting such a pattern to two intermediate plate, it becomes possible to economize on one spacer plate, so that the device as a whole can be made thinner.

Simple sealing conditions are achieved if the said angular nipple is provided with a lateral duct which connects the same directly to the inner side of the intermediate plate.

The stack of spacer plates and membranes between them is preferably gripped between the top plate and the bottom plate with the help of clamping rails arranged between grooves in the top and bottom plates. At least one of these clamping rails is provided appropriately with holes for connecting nipples to provide connection to the duct formed by the said through-holes. These connecting nipples are appropriately arranged so that they are fixed mechanically to the top and bottom plates and/or clamping rails, whilst they are liquid-tight against the spacer plates to provide connection to the duct formed in these by the said through-holes.

When two clamping rails arranged on opposite sides of a longitudinal apparatus are used, one of these clamping rails is provided appropriately with two connection nipples, whilst the other one is not provided with any. As a result the connections will be oriented substantially in the same direction, which constitutes an advantage in practical use.

BRIEF DESCRIPTION OF DRAWINGS

In the following the invention will be described in greater detail with reference to the enclosed drawings, which show by way of example a preferred embodiment of the same.

FIG. 1 shows a device in accordance with the invention seen from above.
FIG. 2 shows the same device seen from the side.
FIG. 3 shows a section along line III—III in FIG. 1.
FIG. 4 shows a section along line IV—IV in FIG. 1.
FIG. 5 shows an intermediate plate included in the device in accordance with the invention seen from underneath.
FIG. 6 shows the same intermediate seen from above.
FIG. 7 shows a section along line VII—VII in FIG. 5.
FIG. 8 shows a section along line VIII—VIII in FIG. 5.
FIG. 9 shows a section along line IX—IX in FIG. 5.
FIG. 10 shows a section along line X—X in FIG. 5.
FIG. 11 finally shows the circular area XI from FIG. 6 detached and on a larger scale.

BEST MODE OF CARRYING OUT THE INVENTION

The preferred embodiment shown as an example is intended first and foremost to be used as a so-called artificial kidney, that is to say for dialysis. It is described therefore in the following with reference to such a treatment.

As is evident most clearly from FIGS. 3 and 4, the device shown comprises a stack of spacer plates 1 with membranes 2 arranged in pairs between them. This stack is arranged between a bottom plate 3 and a top plate 4. Inside the last-named are situated a lower intermediate plate 5 and an upper intermediate plate 6.

The bottom plate 3 and the top plate 4 are held firmly clamped against the stack located between them with the help of clamping rails 7. The dialysis liquid is supplied and withdrawn via identical connecting nipples 8 fixed into holes in one of the clamping rails 7. In the same manner substantially identical inlets and outlets 9 for the blood are provided in the top and bottom plates. If the connection 9 shown in FIG. 1 constitutes the inlet for the blood, a corresponding outlet (not shown) will thus be found on the opposite end of the bottom plate 3.

The apparatus as a whole has an elongated shape with tapering ends. The advantages of such a realization are demonstrated in greater detail in U.S. Pat. Nos. 4,062,778 and 4,113,625, the disclosures of which are incorporated herein by reference thereto.

The connection 8 for dialysis liquid is shown on a larger scale in FIG. 3 connected to an angle nipple 10 on the lower intermediate plate 5. This angle nipple contains an angular duct 11 which is connected with one end to a duct 12 formed by holes 13 in the spacer plates 1 and which runs transversely through the stack of spacer plates 1 and membranes 2. From the holes 13 the dialysis liquid flows through ducts 14 on the one side of the spacer plates, through through-holes 15 in the spacer plates and through ducts 16 on the opposite side of the spacer plates. Thanks to through-holes 17, the dialysis liquid is finally distributed to ducts 18 on the working surface proper of the spacer plates.

Numeral 8a designates a seal between the angle nipple 10 and the connecting nipple 8 which otherwise is fixed mechanically in the bottom plate 3.

In the example shown, the upper side of the lower intermediate plate 5 and the lower side of the upper intermediate plate 6 have been provided with a pattern substantially corresponding to that on the spacer plates. For conducting the dialysis liquid to the upper or inner side of the lower intermediate plate 5, a special lateral duct 19 exists which directly connects the angle duct 11 to the ducts 27 on the inside of the intermediate plate 5.

The duct 12 penetrating through the stack is shut off at the end opposite the angle nipple 10 by a closing plug 21.

A blood outlet or blood inlet 9 is shown on a larger scale in FIG. 4. Here the blood is distributed through a duct 22, which is formed by holes 23 in the spacer plates 1 and by blood buttons 24 shown schematically. The latter, which are arranged between the membranes arranged in pairs, may be of the design, for example, which is described in U.S. Pat. No. 3,837,496, the disclosure which is incorporated herein by reference thereto. At the bottom the duct 22 is shut off by means of a plug 25. The blood is then conducted, as can best be seen from FIG. 6, between the membranes 2 along the ducts 20, and is then distributed on the working surface proper by virtue of the V-shaped duct system 28.

In FIGS. 5-11 the lower intermediate plate 5 is shown in greater detail. Since the upper intermediate plate 6 by and large corresponds to the lower one, there is no need to show or describe it too in greater detail. The spacer plates may be designed substantially in accordance with the upper side of the intermediate plate 5 shown, that is to say largely in accordance with FIGS. 6 and 11. There is no need here either, therefore, for a detailed description.

The angle nipple 10 with angle duct 11 and lateral duct 19 can best be seen in FIGS. 7 and 8. As is evident from these figures, the angle duct 11 is partly divided into two ducts by an inner partition 26. The lateral duct 19 ends in a duct system 27, which can also be seen in FIG. 6, surrounding the one end of the angle duct 11, and in FIG. 3. From the duct system 27 the dialysis liquid issues into a V-shaped duct system 28 and via this into the ducts 18 in the working surface proper of the upper surface of the intermediate plate 5. In the same manner the dialysis liquid issues into corresponding ducts 18 in the spacer plates 1 designed substantially in the same manner.

In FIG. 5 is shown the lower intermediate plate 5 seen from underneath. On the left-hand side in the figure an angle nipple 10 and a blood connection 9 can be discerned. The latter corresponds by and large to the connection 9 shown in FIG. 4 seen from above.

On the right-hand side in FIG. 5, end closures for the ducts 12 or 23 can be seen. They are designated here by numerals 10' and 9' respectively. In the duct closure 10' through-openings 29, 30 and 31 are present, which can also be seen in FIG. 3. The duct closure 9' comprises an oval hole 32 and this can also be seen in FIG. 4 inside the plug 25.

The hole 32 is also evident in FIG. 10, where the through-openings 29, 30 and 31 are also noticeable.

Numeral 33 generally designates sealing beads, adapted so as to press together in a tight manner the membranes arranged in pairs, in order to prevent blood and dialysis liquid from becoming mixed. At the same time they seal the apparatus towards the outside.

Other details shown on the drawings should be fairly self-explanatory to those skilled in the art, or they are of minor importance in respect of the invention and do not, therefore, require detailed description.

Naturally, the invention is not limited exclusively to the embodiment described above, but may be varied within the scope of the following claims. For example, the apparatus shown may be combined with one or more details from the aforementioned patents, which, together with the present application, describe a series of apparatuses which can be said to form a joint chain of development.

We claim:

1. A device for the diffusion of substances between first and second fluids through semi-permeable membranes, comprising a stack of alternating spacer plates and semi-permeable membranes, each of said spacer plates and semi-permeable membranes being substantially flat and including an elongated middle portion and tapered end portions extending away from said middle portion, said stack thus having tapered end portions and being of a substantially uniform height throughout, said stack having opposite substantially parallel top and bottom faces, first and second end plates each having an inner surface and an outer surface, said inner surfaces facing said top and bottom faces of said stack, clamping means for clamping said first and second end plates together with said stack therebetween, inlet and outlet passages for said first fluid, inlet and outlet passages for said second fluid, first fluid inlet means for feeding said first fluid to said inlet passage for said first fluid, first fluid outlet means for withdrawing said first fluid from said outlet passage for said first fluid, second fluid inlet means for feeding said second fluid to said inlet passage for said second fluid, second fluid outlet means for withdrawing said second fluid from said outlet passage for said second fluid, distribution means for conducting said first and second fluids on opposite sides of said semipermeable membranes as said first and second fluids pass from their respective inlet passages to their respective outlet passages, first fluid duct means forming a part of one of said first fluid inlet and outlet means and being disposed within one of said tapered end portions between the outer surfaces of said first and second end plates, said one of said first fluid inlet and outlet means also including first fluid nipple means sealingly connected to said first fluid duct means, and wherein said first fluid nipple means extends exteriorly of and away from said one of said tapered end portions and is entirely contained within a volume bounded by a portion of a rectangular perimeter defined by the maximum width of said stack and the maximum length of said stack, by the outer surface of the tapered surface from which said first fluid nipple means extends, and by said outer surfaces of said first and second end plates such that said first fluid nipple means is disposed within a volume defined by outer surfaces of said device which cooperate to provide an enclosure which provides protection against inadvertent damage to said first fluid nipple means.

2. The device of claim 1 wherein said clamping means comprises corresponding groove means located on both said first and second end plates, and lateral clamping rail means interconnecting said groove means.

3. The device of claim 2 wherein said lateral clamping rail means includes an aperture providing access to said first fluid duct means.

4. The device of claim 3 wherein said first fluid nipple means passes through and is affixed to said aperture in said lateral clamping rail means.

5. The device of claim 1 wherein both said first fluid inlet means and said first fluid outlet means include said first fluid duct means and a said first fluid nipple means, and both said first fluid nipple means are disposed within said volume defined by said outer surfaces of said device which cooperate to provide an enclosure which provides protection against inadvertent damage to each of said first fluid nipple means.

6. The device of claim 5, wherein said clamping means comprises corresponding groove means located on both said first and second end plates, and lateral clamping rail means interconnecting said groove means.

7. The device of claim 6 wherein said lateral clamping rail means comprises first and second clamping rail means on both sides of said device.

8. The device of claim 7, wherein said first clamping rail means includes first and second apertures providing access to both of said first fluid duct means.

9. The device of claim 8 wherein each of said first fluid nipple means passes through and is affixed to one of said first and second apertures in said first clamping rail means.

* * * * *